J. T. NEEDHAM.
SUGAR CANE HARVESTER.
APPLICATION FILED FEB. 26, 1908.
985,440.
Patented Feb. 28, 1911.
2 SHEETS—SHEET 1.
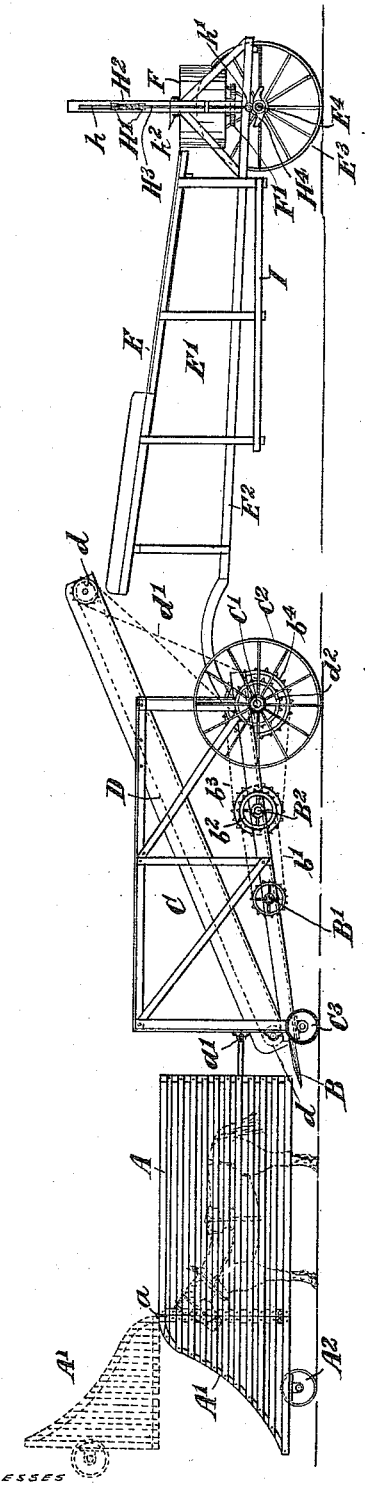
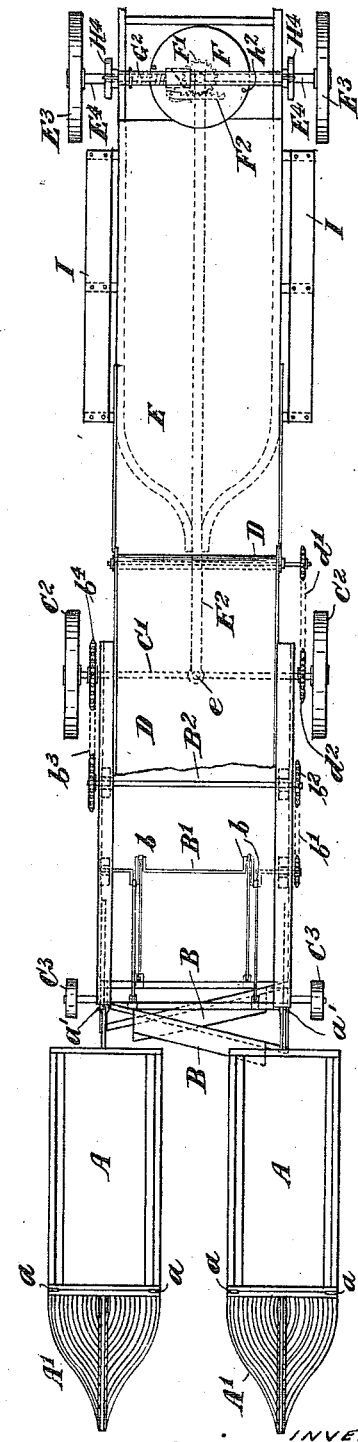

J. T. NEEDHAM.
SUGAR CANE HARVESTER.
APPLICATION FILED FEB. 26, 1908.

985,440.

Patented Feb. 28, 1911.
2 SHEETS—SHEET 2.

WITNESSES
W. P. Burke
W. H. Kennedy

INVENTOR
Joseph Thomas Needham
ATTY.

UNITED STATES PATENT OFFICE.

JOSEPH THOMAS NEEDHAM, OF HERBERTON, NORTH QUEENSLAND, AUSTRALIA.

SUGAR-CANE HARVESTER.

985,440.  Specification of Letters Patent.  Patented Feb. 28, 1911.

Application filed February 26, 1908. Serial No. 417,884.

*To all whom it may concern:*

Be it known that I, JOSEPH THOMAS NEEDHAM, a subject of the King of Great Britain and Ireland, residing at Herberton, North Queensland, in the Commonwealth of Australia, (temporarily residing in Melbourne, Australia,) have invented certain new and useful Improvements in Sugar-Cane Harvesters, of which the following is a specification.

This invention relates to an improved sugar cane harvester which cuts the stools of cane near the root, then elevates it on to a platform or table whereon the cane is so placed that its top portion is brought under a drop knife which severs the tops from the stalks.

The harvester is operated and propelled by horse power, each horse being protected from contact with the cane by means of a guard or fender arranged about it and the front portion of which is so constructed that it lifts and guides the fallen cane to a position in front of the knives which cut it off at its stools as before stated, also the guards form a passage way for the horses between the rows of cane.

The invention will now be fully described aided by a reference to the accompanying sheets of drawings in which:—

Figure 3:
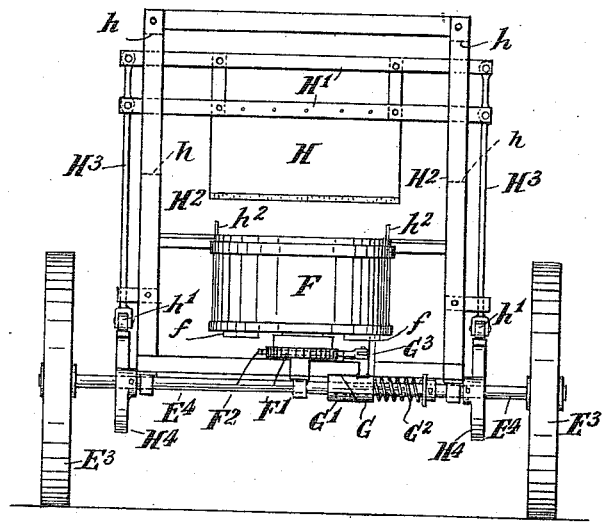
Figure 4:
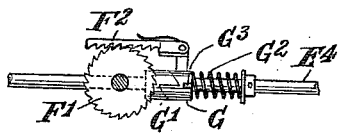

Figure 1 is a side elevation and Fig. 2 a plan of the improved sugar cane harvester and Fig. 3 an enlarged back end view showing the knife and block for cutting the tops from the cane stalks. Fig. 4 is a detail plan of the operating gear for the chopping block, Fig. 5 an enlarged detail sectional view of the cane cutting knives and Fig. 6 a transverse section on line $x$—$x$ Fig. 5.

In constructing a sugar cane harvester according to this invention the front portion A of machine to which the horses are attached is built up in the form of two fenders or guards constructed of suitable frame work, the sides of which are covered with light laths spaced at a suitable distance apart, the front part $A^1$ of said fenders being hinged at $a$ to the rear portion A so that it can be raised to allow of the horses being backed into the fender A, said front portion $A^1$ is constructed as shown so that when the machine is being drawn forward by the horses the fallen cane is lifted and a passage way formed between each row of stools of cane and at same time direct the stalks on to the cutting knives B. Said fender A is provided with a land wheel $A^2$ and is connected at $a^1$ to the conveyer and knife carriage C and is furnished with the necessary draft hooks and the like for attachment to the tug chains.

Figure 5:
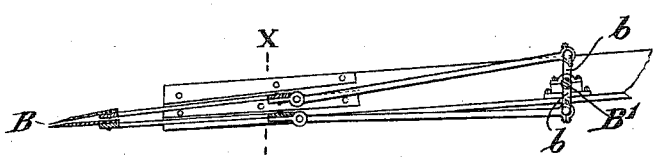
Figure 6:

The cane cutting knives B are situated at the front bottom end of the carriage C and are angularly arranged, one above the other, as shown in Figs. 2 and 5, while they receive a reciprocating motion by cranks $b$ on a transverse shaft $B^1$ carried in bearings on the bottom side beam of said carriage C. Said crank shaft $B^1$ receives motion by a sprocket chain $b^1$ from a sprocket wheel $b^2$ on a counter shaft $B^2$ which in turn is driven by a sprocket chain $b^3$ from a sprocket wheel $b^4$ secured on the main axle $C^1$, said carriage C is borne on four wheels, two large hind wheels $C^2$ and two small front wheels $C^3$ and is furnished with a seat for driver (not shown).

The conveyer or elevator D which receives the cut cane from the knives B is arranged as shown in Fig. 1 and consists of an endless traveling belt passing over rollers $d$ driven by sprocket chain $d^1$ from a sprocket wheel $d^2$ on main axle $C^1$. The cane is delivered by the elevator or conveyer D on to a platform or table E which is arranged at the desired angle at the top of a suitable frame work $E^1$, the draw bar $E^2$ of said frame $E^1$ is connected by a king pin $e$ to the main axle $C^1$ of the conveyer or elevator carriage C. The rear end of said frame $E^1$ is carried on large land wheels $E^3$, the axle $E^4$ of which is carried in suitable bearings attached to the bottom side beams of said frame. Arranged centrally above the axle $E^4$ is a revolving chopping block F suitably supported thereat and arranged at about a level with the rear end of said platform or table. Said chopping block F is rotated by means of a ratchet wheel $F^1$ which is operated by a sliding ratchet bar $F^2$ attached to the sliding half G of a toothed cam arranged to slide on the axle $E^4$ the other half $G^1$ of said cam being keyed or otherwise secured on said axle $E^4$. By the rotation of the axle $E^4$ the sliding half G of said cam is forced outward by the fixed half $G^1$ and then returned to its normal position by aid of a coil or other spring $G^2$ as the jaws of the cam come into contact. By this means the ratchet wheel $F^1$ and chopping block F is rotated intermittently by the ratchet bar $F^2$. At each revolution of the axle $E^4$ the block F is rotated one half of a revolution while to retain the block stationary during the chopping operation a vertical bar or rod $G^3$ projects up from the sliding cam piece G and is designed to take into a slotted lug $f$ secured to the under side of block F at each half revolution. Arranged above the said chopping block E is a drop knife H which is connected to cross bars $H^1$ which slide in slots $h$ formed in standards $H^2$ arranged one at each side. Vertical lifting rods $H^3$ are connected at their upper ends to the cross bars $H^1$ while the lower end of each lifting rod is furnished with friction roller $h^1$ which contacts with a two winged lifting cam $H^4$ secured on the axle $E^4$ and which cam lifts the knife H and allows it to drop and cut off the tops of the cane. Said tops are then removed from the block, in one direction transversely by vertical pins $h^2$ projecting therefrom, and delivered to the near side of the machine while the stalks of cane are removed from the block in the opposite direction transversely by said pins $h^2$ and delivered to the off side of the machine during the rotation of said block, such removal being aided by the man in attendance and standing on platform I.

Suitable platforms I are arranged one at each side of said framing E to allow an attendant to stand and arrange the cane in proper position under the drop knife which severs the tops from the stalks.

Having now described my invention what I claim as new and desire to secure by Letters Patent is:—

1. A harvester comprising cutting knives, a conveyer for receiving the material from the knives, and a fender entirely inclosing the horse at the sides connected to the front of the harvester for directing the material to be cut toward the knives.

2. A harvester comprising cutting knives, means for receiving the material therefrom, a pair of fenders entirely inclosing the horse at the sides and connected to the front of the machine and having means thereon for directing the material to be cut toward the knives, and a front carrying wheel on each fender.

3. In combination with a harvester, a fender having a movable front portion and a body portion entirely inclosing the horse at the sides, and a carrying wheel on the bottom portion of said movable portion.

In testimony whereof I have hereunto set my hand in presence of two subscribing witnesses.

JOSEPH THOMAS NEEDHAM.

Witnesses:
BEDLINGTON BODYCOMB,
JOHN DELBRIDGE.

---

Copies of this patent may be obtained for five cents each, by addressing the "Commissioner of Patents, Washington, D. C."